United States Patent [19]
Calderazzo et al.

[11] Patent Number: 5,821,189
[45] Date of Patent: Oct. 13, 1998

[54] CATALYST FOR THE HOMOPOLYMERIZATION OR COPOLYMERIZATION OF ETHYLENE AND PROCESS FOR ITS PREPARATION

[75] Inventors: Fausto Calderazzo, Ghezzano; Guido Pampaloni, Pontedera; Francesco Masi, S. Donato Mil.Se; Andrea Vallieri, Comacchio., all of Italy

[73] Assignee: Enichem S.p.A., Milan, Italy

[21] Appl. No.: 444,870

[22] Filed: May 19, 1995

[30] Foreign Application Priority Data

May 20, 1994 [IT] Italy .................................. MI94A1024

[51] Int. Cl.⁶ ............................ B01J 31/00; B01J 37/00; C08F 4/02; C08F 4/60
[52] U.S. Cl. ......................... 502/152; 502/102; 502/113; 502/128; 502/131; 502/153; 502/154; 502/169
[58] Field of Search ..................................... 502/102, 113, 502/128, 131, 153, 154, 169, 152

[56] References Cited

U.S. PATENT DOCUMENTS

| | | | |
|---|---|---|---|
| 4,980,491 | 12/1990 | Calderazzo et al. | 556/43 |
| 5,093,508 | 3/1992 | Calderazzo et al. | 556/43 |
| 5,128,295 | 7/1992 | Porri et al. | 502/117 |
| 5,210,244 | 5/1993 | Calderazzo et al. | 556/43 |
| 5,382,557 | 1/1995 | Masi et al. | 502/107 |

FOREIGN PATENT DOCUMENTS

| | | | |
|---|---|---|---|
| 647296 | 1/1993 | Australia | 556/43 |
| 0 358 265 | 3/1990 | European Pat. Off. | |
| 1388997 | 1/1965 | France | 502/102 |
| 2 280 654 | 2/1975 | France | |

OTHER PUBLICATIONS

*Journal of Organometallic Chemistry*, vol. 430, pp. 317–325, 1992, S.I. Troyanov, "The Crystal Structure of $(N_6-C_6Me_6)Ti[(u-Cl)_2(AlClEt)]_2$ and the Catalytic Activity of the $(C_6Me_6)TiAl_2Cl_{8-x}-Et_x$ (X=0–4) Complexes Towar4ds Butadiene" no month.

*Primary Examiner*—Mark L. Bell
*Assistant Examiner*—J. Pasterczyk
*Attorney, Agent, or Firm*—Oblon, Spivak, McClelland, Maier & Neustadt, P.C.

[57] ABSTRACT

A catalyst for the (co)polymerization of ethylene is obtained by a process comprising the contact of the following components (A), (B), (C) and (D) in the respective molar ratios (1):(0.5–2):(0–25):(0–15):

(A): a bivalent arene of titanium having the formula $$Ti\,(\eta^6\text{-arene})(AlR_xX_{4-x})_2;$$

wherein: "arene" indicates benzene, or benzene substituted with from 1 to 6 $C_1$–$C_{10}$ alkyl groups;

each X independently represents a chlorine, bromine or fluorine atom;

R is a $C_1C_{10}$ alkyl group, linear or branched; "x" is a number varying from 0.5 to 2.5;

(B): a compound or a mixture of compounds selected from the group consisting of the chlorides or bromides of the metals titanium, zirconium, vanadium, hafnium, tin, germanium, cerium or osmium, in the oxidation state (+4), and antimony or vanadium in the oxidation state (+5), and the derivatives of these metals in said oxidation state with oxygenated binders wherein at least one oxygen atom is bound or co-ordinated to the metal;

(C): an aluminum alkyl or halide of aluminum alkyl (D): an organic chloroderivative selected from: (a) di- or poly-chloroalkanes; (b) alkyl esters of aliphatic carboxylic acids di- or tri-chlorosubstituted on the carbon in the alpha position with respect to the carboxyl; and (c) derivatives of chlorotriphenylemethane or dichlorodiphenylmethane having a carboxyalkyl group in the para position of at least one of the phenyl rings.

19 Claims, No Drawings

CATALYST FOR THE HOMOPOLYMERIZATION OR COPOLYMERIZATION OF ETHYLENE AND PROCESS FOR ITS PREPARATION

The present invention relates to a polymerization catalyst and its use in processes for the homopolymerization or copolymerization of ethylene. The invention also relates to a process for the preparation of a precursor of said catalyst.

Polymerization catalysts of olefins are known in the art, obtained starting from a transition metal arene, where the transition metal is in its zerovalent state. For example according to the patent U.S. Pat. No. 4,987,111, the ethylene is homopolymerized, or copolymerized with an alpha-olefin, in the presence of a catalyst consisting of an aluminum trialkyl and a solid component obtained by contact of a vanadium (zero-valent) arene and titanium tetrachloride. Although interesting results have been obtained by using this catalyst, its use however is limited owing to the difficulties involved in its preparation and use of the zerovalent vanadium-arene complexes necessary for its production, with the consequent high cost of the industrial embodiment of the polymerization process.

Several titanium arene complexes, with the titanium in its bivalent state, are also described in the art. For example P. Biagini et al., in J. Organomet. Chem. 355 (1988) 99, describe arene complexes of bivalent titanium which can be represented with the formula $(\eta^6\text{-benzene})\text{Ti}[(\mu,X)_2(AlX_2)]_2$ (X=Cl,Br,I); J. Polacek et al., in J.Mol.Catal., 29 (1985) 165 and 58 (1990) 53, describe complexes $(\eta^6\text{-}C_6H_6)\text{TiAl}_2\text{Cl}_{8-x}\text{Et}_x$ (x=0–2); and S. I. Troyanov et al., in J. Organomet.Chem., 430(1992) 317, describe complexes $(\eta^6C_6\text{-Me}_6)\text{TiAl}_2\text{Cl}_{8-x}\text{Et}_x$ (x=0–4). These titanium arene complexes are generally prepared with costly methods and are considered to be useful as trimerization catalysts of butadiene, possibly combined with an aluminum alkyl. No mention is made however of the use of these complexes in the field of olefin polymerization.

The present invention is basically based on the discovery that some titanium-arene complexes, with titanium in its bivalent state, soluble in an aliphatic or aromatic hydrocarbon solvent, allow the production of polymerization catalysts of olefins, which have numerous advantages with respect to the catalysts of the known art.

In particular, it has been found that by putting said titanium arene complexes in contact with measured quantities of particular compounds of transition metals and optionally with an organometallic compound of aluminum and an organic activator containing chlorine, catalysts are obtained which are highly active in the homopolymerization of ethylene and copolymerization of ethylene with alpha-olefins.

A simple and convenient process has also been found which allows the preparation, with high yields, of said arene complexes of bivalent titanium.

In accordance with this, a first aspect of the present invention relates to a catalyst for the (co)polymerization of ethylene, said catalyst being obtained by a process comprising the contact of components (A), (B), (C) and (D) in the respective molar ratios (1): (0.5–2):(0–25):(0–15), said components consisting of:

(A) an arene of divalent titanium having the formula Ti($\eta^6$-arene) (AlR$_x$X$_{4-x}$)$_2$;

(B): a compound or a mixture of compounds selected from the halides, particularly chlorides and bromides, of the metals titanium, zirconium, vanadium, hafnium, tin, germanium, cerium or osmium, in the oxidation state (+4), and antimonium or vanadium in the oxidation state (+5), and the halogenated or non-halogenated derivatives of these metals in said oxidation state with oxygenated binders wherein at least one oxygen atom is bound and/or coordinated to the metal;

(C): an organic compound of aluminum having the formula AlR'$_z$Z$_{3-z}$;

(D): an organic chloroderivative selected from:
(a) di- or poly-chloroalkanes;
(b) alkyl esters of aliphatic carboxylic acids di- or tri-chlorosubstituted on the carbon in alpha position with respect to the carboxyl, and
(c) derivatives of chlorotriphenylmethane or dichlorodiphenylmethane having a carboxyalkyl group in the para position of at least one of the phenyl rings;

wherein, in the above formulae:
"arene" indicates benzene, or benzene substituted with from 1 to 6 $C_1$–$C_6$ alkyl groups;
each X independently represents a chlorine, bromine or fluorine atom;
Z represents a chlorine or bromine atom;
R is a $C_1$–$C_{10}$ alkyl group, linear or branched;
R' is a $C_1$–$C_{10}$ alkyl group, linear or branched;
"x" is a number varying from 0.5 to 2.5;
"z" is a number varying from 1 to 3.

Each of the components (A), (B), (C) and (D), which can be used for obtaining the catalyst precursor of the present invention, is described in more detail herebelow Component (A)

Component (A) of the catalyst of the present invention is an arene complex of bivalent titanium, soluble in hydrocarbons, and which can be defined by the following formula:

Ti($\eta^6$-arene) (AlR$_x$X$_{4-x}$)$_2$ wherein arene indicates benzene or benzene substituted with from 1 to 6 $C_1$–$C_6$ alkyl groups; R is a $C_1$–$C_{10}$ alkyl group, preferably $C_2$–$C_8$, linear or branched; X is a chlorine, bromine or fluorine atom; and x is a number varying from 0.5 to 2.5, preferably from 0.5 to 1.5.

According to the present invention, also mixtures of two or more compounds included in the previous formula are considered as contained in the meaning of component (A). In this case the quantity in moles of component (A) is given by the sum of the moles of each compound in the mixture.

The arene is preferably benzene or benzene substituted with 1 to 6 methyl groups, such as for example, toluene, ortho-, meta- and para-xylene, 1,2,3-trimethylbenzene, 1,2,4-trimethylbenzene, 1,3,5-trimethylbenzene (mesitylene) and hexamethylbenzene. Among these toluene and trimethylbenzene isomers are particularly preferred.

In the formula of component (A), R represents particularly an ethyl, butyl, isobutyl and n-octyl group and X represents the chlorine atom.

Specific examples of component (A) are therefore:
Ti($\eta^6$-TOL) (AlEt$_x$Cl$_{4-x}$)$_2$,
Ti($\eta^6$TOL) (AlBu$^i_x$Cl$_{4-x}$)$_2$,
Ti($\eta^6$-TOL) (AlOct$_x$Cl$_{4-x}$)$_2$,
Ti($\eta^6$-1,3,5-TMB) (AlEt$_x$Cl$_{4-x}$)$_2$,
Ti($\eta^6$-1,3,5-TMB) (AlBu$^i_x$Cl$_{4-x}$)$_2$,
Ti($\eta^6$-1 3,5-TMB) (AlOct$_x$Cl$_{4-x}$)$_2$,
Ti($\eta^6$-1,2,3-TMB) (AlEt$_x$Cl$_{4-x}$)$_2$,
Ti($\eta^6$-1,2,3-TMB) (AlBu$^i_x$Cl$_{4-x}$)$_2$ and
Ti($\eta^6$-1,2,3-TMB) (AlOct$_x$Cl$_{4-x}$)$_2$,
wherein: TOL=toluene, TMB=trimethylbenzene, Et=ethyl, Bu$^i$=isobutyl and Oct=n-octyl, and wherein "x" is a number varying from 0.5 to 1.5.

Component (A) is soluble in the normal aliphatic and aromatic hydrocarbon solvents, such as benzene, toluene, xylenes, hexane, heptane, octane, decane, dodecane, cyclohexane or methylcyclohexane.

Component (B)

Component (B) of the catalyst of the present invention basically consists of a compound or mixture of compounds selected from the halides, particularly chlorides and bromides, of the metals titanium, zirconium, vanadium, hafnium, tin, germanium, cerium or osmium, in the oxidation state (+4), and antimonium or vanadium in the oxidation state (+5), and the derivatives of these metals in said oxidation state with oxygenated anionic binders wherein at least oxygen atom is bound and/or co-ordinated to the metal.

Halides which can be used as component (B) according to the present invention are compounds having general formula $MX'_4$ or $SbX'_5$ or $VOX'_3$ (vanadyl halides) wherein M represents a metal in the oxidation state (+4) selected from titanium, vanadium, zirconium, hafnium, tin, germanium, cerium or osmium, and each X' independently represents a fluorine, chlorine, bromine atom. Among the different halides represented by the above formula, chlorides are preferred, and among these particularly the tetrachlorides of titanium, vanadium, zirconium, hafnium and tin, and vanadyl trichloride.

Derivatives of the above metals with oxygenated binders wherein at least one oxygen atom is bound and/or co-ordinated to the metal, suitable for the formation of component (B) of the catalyst of the present invention, are alkoxides, aryloxides, carboxylates, and the corresponding derivatives mixed with halides having one of the following formulae:

$$M''(OR''')_y X''_{n-y};$$

$$M''(OOCR''')_w X''_{m-w}$$

wherein:

M" and M'" independently represent titanium (Ti), vanadium (V), zirconium (Zr), hafnium (Hf), tin (Sn), germanium (GE, cerium (Ce), osmium (Os) antimonium (Sb) and vanadyl (VO);

X" and X'" independently represent a fluorine, chlorine or bromine atom;

R" is an aliphatic hydrocarbon group, containing from 1 to about 25 carbon atoms, or cycloaliphatic or aromatic containing from 6 to about 25 carbon atoms;

R'" is a linear or branched alkyl group having from 1 to 10 carbon atoms, or a cycloalkyl or aryl group, possibly alkyl-substituted having from 6 to 12 carbon atoms;

"m" and "n" represent respectively the valence of M" and M'" and have the value "4" when M" or M'" are Ti, V, Zr, Hf, Sn, Ge, Ce and Os; the value "5" when M" or M'" are Sb and the value "3" when M" or M'" are VO (vanadyl);

"y" is a number varying from 1 to "n";

"w" is a number varying from 1 to "m".

Components (B) having formula $M'''(OR''')_y X'_{n-y}$ preferably consist of tetraoxide, tetrapropoxide, tetra-n-butoxide and tetra-iso-butoxide (wherein "n" and "y" in the previous formula have the value of "4"), and relative alkoxychlorides (wherein in the previous formula, "y" is between "1" and "3", "n" is "4" and X'" is Cl) of titanium, vanadium, zirconium, hafnium, tin, germanium, cerium and osmium and the corresponding triderivatives of vanadyl wherein "n" is 3.

Preferred components (B) having the formula $M''(OOCR''')_w X''_{m-w}$ are tetra-n-decanoates, tetra-n-undecanoates, tetra-iso-butyrates, tetra-2-ethylhexanoates, tetra-2,2-dimethylpropanoates, tetra-versatates, tetra-3-ethylpentanoates, tetra-citronallates, tetra-naphthenates, tetra-2-phenybutyrates, salicylates and the corresponding chloride-carboxylates (wherein, in the above formula, "m" is "4", "w" is between 1 and 3 and X" is Cl) of titanium, vanadium, zirconium, hafnium, tin, germanium, cerium and osmium. Also preferred are the tri-derivatives of vanadyl with the above carboxylate binders.

Among the derivatives of component (B) of the present invention, acetylacetonates and acetylacetates of titanium, vanadium (+4), zirconium, hafnium, tin, germanium, cerium, osmium, vanadyl and antimonium can also be used together with the corresponding chloride-acetylacetonates or chloride-acetylacetates.

Components (B) which are particularly advantageous for the purposes of the present invention have proved to be the following compounds:

$TiCl_4$, $VCl_4$, $VOCl_{13}$, $HfCl_4$, $ZrCl_4$, $SbCl_4$, $Ti(O—n—Bu)_4$, $Ti(Vers)_2Cl_2$, $V(Vers)_2Cl_2$, $VO(O—Pr^i)_3$ In the above formulae the symbol "$Pr^i$" indicates isopropyl and the symbol "Vers" indicates the versatate group corresponding to the carboxylate residue of versatic acid, a mixture of carboxylic acids having the formula:

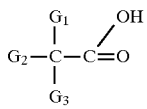

wherein $G_1$, $G_2$ and $G_3$ are alkyl groups so that the sum of the carbon atoms of all three groups is equal to 8.

According to the present invention, component (B) also comprises the mixtures of two or more compounds included in any of the above formulae. In this case the quantity of moles of component (B) is given by the sum of the moles of each compound in the mixture. Also included in the meaning of component (B) are all the metallic compounds of the above formulae having mixed substituents included in the definitions of X, R" and R'" specified above.

When in component (B) the metal M is titanium, catalysts will be obtained with a single transition metal, i.e. monometallic catalysts. When in said component (B) the metal M is vanadium, zirconium, hafnium, tin, germanium, cerium, osmium or antimony, bimetallic catalysts will be obtained.

Component (C)

Component (C) of the catalyst of the present invention is an aluminium alkyl or halide of aluminium alkyl, which can be defined with the formula: $AlR'_z Z_{3-z}$, wherein R' is a $C_1$–$C_{10}$ alkyl group, linear or branched; Z is a chlorine or bromine atom; and "z" is a number varying from 1 to 3 and is preferably 3.

R preferably represents an alkyl group containing from 2 to 8 carbon atoms and Z represents the chlorine atom. Preferred components (C) are consequently aluminium triethyl, aluminium tri-isobutyl, aluminium n-octyl, aluminium diethyl chloride, aluminium ethyl dichloride, aluminium ethyl sesquichloride, aluminium di-iso-butyl chloride, aluminium iso-butyl dichloride, aluminium di-n-octyl chloride and aluminium octyl dichloride.

Component (D)

Component (D) is optionally used to obtain the catalyst of the present invention with the function of activator to further increase the catalytic activity in the polymerization of olefins.

As already mentioned, component (D) of the present invention is an organic chloroderivative advantageously selected from the following groups of compounds:

(a) di- or poly-chloroalkanes, (b) alkyl esters of aliphatic carboxylic acids di- or tri-chlorosubstituted on the carbon in alpha position with respect to the carboxyl group, and (c) derivatives of chlorotriphenylmethane or dichlorodiphenylmethane having a carboxyalkyl group in para position of at least one of the phenyl rings.

Organic chloroderivatives of group (a) which can be used as component (D) of the present invention can be selected from:

dichloromethane;

$\alpha,\beta$-dichloroalkanes, as represented by the following formula:

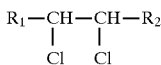

wherein $R_1$ and $R_2$ each independently represent a hydrogen atom or a $C_1$–$C_{10}$ (preferably $C_1$–$C_5$) alkyl group;

$\alpha,\omega$-dichloroalkanes, as represented by the following formula:

wherein r is an integer from 1 to 10 (preferably from 1 to 5);

trichloroalkanes and tetrahaloalkanes having the chlorine atom on the two chain-end carbon atoms, as represented by the formula:

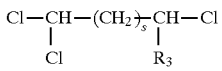

wherein $R_3$ represents a halogen atom, preferably chlorine and s is an integer from 1 to 10 (preferably from 1 to 5);

trichloroalkanes having the chlorine atoms on a chain-end carbon atom, represented by the following formula:

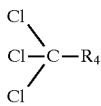

wherein $R_4$ represents a $C_1$–$C_{10}$ (preferably $C_1$–$C_5$) alkyl group.

Specific examples of components (D) of group (a) are 1,2-dichloroethane, 1,3-trichloropropane, 1,4-dichlorobutane, 2,3-dichlorobutane, 1,4-dichloropentane, 1,6-dichlorohexane, 1,1,1-trichloroethane and 1,1,2-trichloroethane. Among these activators 1,2-dichloro-ethane and 2,3-dichlorobutane are preferred.

Organic chloroderivatives of group (b) which can be used as component (D) of the present invention can be selected from those which can be defined by the following formula:

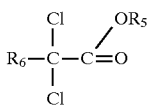

wherein $R_6$ represents a hydrogen atom, a chlorine atom or a $C_1$–$C_{10}$ (preferably $C_1$–$C_5$) alkyl group and R represents a $C_1$–$C_{10}$ (preferably $C_1$–$C_5$) alkyl group.

Specific examples of components (D) of group (b) are the methyl and ethyl esters of 1,1-dichloroacetic acid and 1,1,1-trichloroacetic acid.

Organic chloroderivatives of group (c) which can be used as component (D) of the present invention can be selected from those which can be defined by the following formulae:

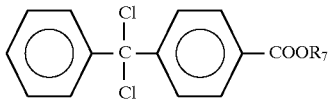

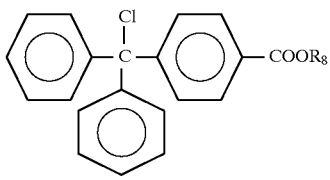

wherein $R_7$ and $R_8$ independently represent a $C_1$–$C_{10}$ (preferably $C_1$–$C_5$) alkyl group.

Specific examples of activators (c) are those corresponding to the above formulae wherein $R_7$ or $R_8$ represent the methyl or ethyl group.

Catalyst

The catalyst of the present invention is obtained by contact of components (A) and (B), and possibly (C) and/or (D), defined above, with molar ratios between the components (A) : (B) : (C) : (D) having values respectively within the ranges (1.0):(0.5–2.0):(0.0–20): (0.0–15). For the purposes of the present invention values of molar ratios (A):(B):(C):(D) of about (1.0): (0.5–2.0):(0.0–16):(3.0–10) are however preferred.

It is convenient for the contact to take place in a diluent consisting of an aliphatic or aromatic inert hydrocarbon (for example hexane, heptane, octane, decane, dodecane, benzene, toluene and xylene), outside the polymerization reactor or inside the reactor itself, operating at room temperature (20°–25° C.) or a higher temperatures, for example at polymerization temperature, up to 250° C.

It is also possible for component (B) to be supported on solid compounds, for example anhydrous silica, which are insoluble in the contact solvent and inert with respect to component (A).

According to the present invention, for each type of component (B), especially depending on the type of metal, there is a preferential ratio with which components (A) and (B) are put in contact. This ratio is generally the stoichiometric value determined from the number of electrons which a molecule of component (B) (with the function of oxidant) is capable of supplying to bring the oxidation state of the titanium ($\eta^6$-arene) in component (A) from +2 to +3. For example, when component (B) consists of $VCl_4$, whose oxidation state passes typically from +4 to +3 in the reacton with $Ti(+2)(\eta^6$-arene), the preferential ration in moles, between (A) and (B) will be 1/1. If, on the other hand (B) is $SnCl_4$, whose oxidation state passes from +4 to +2, the preferential ratio, in moles, between (A) and (B) will be 2/1. There is also the same preferential ratio of 2/1 when (B) is $VOCl_3$ which is reduced to VOCl.

The present invention should not be considered as being limited however by the preferential contact ratio between (A) and (B) indicated above, as advantageous results can also be obtained for all the other molar ratio values (A)/(B) of between 2/1 and 1/2. In particular, component (B) can be in excess with respect to the preferential ratio. In this case, as well as the titanium (+2) ($\eta^6$-arene), also the aluminium alkyl halide having formula $AlR_xX_{3-x}$ which develops from the competent portion of component (A), i.e. the $(AlR_xX_{4-x})^-$, will act as reducing agent.

The nature of the products which are formed following the above contact between (A) and (B) is not completely certain. However from tests carried out outside the polymerization environment, and quoted in the experimental samples, it seems that when components (A) and (B) are put in contact in an aliphatic hydrocarbon, a solid precipitates, hereafter called procatalyst, which contains titanium and the metal M, in proportions practically corresponding to those in the feeding, as well as halogen, aluminium and an organic fraction. A product remains dissolved in the hydrocarbon diluent, containing aluminium and halogen, most probably an aluminium alkyl halide which develops from the competent portion of component (A) used. The formation of the latter compound may make the use of component (C) of the catalyst superfluous, as the suspension containing the procatalyst and compound of aluminium and halogen obtained by the contact of (A) and (B) in the hydrocarbon, is already active in the polymerization catalysis of the olefins. If it is considered however that, in industrial practice, the polymerization environment normally contains impurities which degrade the organometallic compounds of aluminium, component (C) will be normally used in a quantity which is at least equal to that which acts as scavenger for these impurities.

In any case, in the present invention neither the way of contact of the catalyst components, nor the order of times with which they are interacted, is critical.

Consequently, in a first embodiment, components (A) and (B), and possibly (C), are fed directly to the polymerization reactor, as separate streams, or after mixing any two of these or all three components.

In a second embodiment, components (A) and (B) are put in contact with each other in a hydrocarbon diluent, until the procatalyst mentioned above precipitates, and the suspension thus obtained is fed to the polymerization reactor, together with the possible component (C).

In a third embodiment, the catalyst precarsor obtained by putting (A) and (B) in contact with each other as above, is separated from the relative suspension in the hydrocarbon diluent and the separated solid is fed to the polymerization reactor together with or after component (C) which, in this form of embodiment, must be present for the reasons specified above.

Component (D), when present, can be added in the polymerization environment as a separate feeding, or together with the procatalyst obtained from (A) and (B) or together with each single component (A), (B) or (C).

In accordance with a fourth form of embodiment of the present invention, components (A) and (B) are put in contact with each other in a hydrocarbon diluent, until the procatalyst precipitates, and the suspension thus obtained is fed to the polymerization reactor, together with components (C) and (D).

In accordance with a particular embodiment component (D) is introduced together with (A) and (B) in the preparation phase of said procatalyst by contact with the reagents titanium (arene)(divalent), titanium tetrachloride and/or vanadium or tin tetrachloride.

Examples of these various embodiments are provided in the experimental part.

Polymerization

In a further aspect, the present invention relates to a process for the (co)polymerization of ethylene, characterized in that the catalyst described above is used.

In particular the catalyst of the present invention is active in the homopolymerization of ethylene and in the copolymerization of ethylene with a $C_3$–$C_{10}$ alpha-olefin, operating with the technique in suspension, in an inert diluent (temperature generally ranging from about 30° to about 95° C.) or with the technique in solution (temperatures of about 140°–160° C).

In the homopolymerization of ethylene the catalyst of the present invention permits the production of polymers from a limited (monometallic catalysts) to average and to wide (bimetallic catalysts) molecular weight distribution. The selection of the most suitable conditions and catalyst for obtaining the distribution desired each time is left to the expert in the field, and requires, at the most, experimental adjustments of a projectual nature. Polymers with a limited molecular weight distribution are particularly useful for processing with injection moulding technique, whereas those with a wider distribution are suitable for transformation with the blow-moulding technique in the production of films and various end-products, as well as with the injection moulding technique. In the copolymerization of ethylene with alpha-olefins, particularly butene-1 and hexene-1, the catalyst permits the production of linear low density polyethylenes, particularly suitable for transformation with the blow-moulding and injection moulding techniques, depending on the molecular weight distribution. Also in this case the selection of mono- or bi-metallic catalysts will permit the molecular weight distributions to be regulated as desired.

The catalysts obtained with the present invention also allow ethylene-propylene copolymers to be advantageously obtained, with a low crystallinity having a high content of propylenic units, preferably of between 10 and 50% with respect to the total number of monomeric units in the copolymer, and non-conjugated terpolymers of the ethylene-propylene-diene type having a low crystallinity and a high content of propylene, wherein the content of branching or cross-linking is practically absent. These copolymers can be conveniently obtained by the copolymerization of suitable mixtures of the above monomers, in solution or suspension, in the presence of the catalyst of the present invention. The polymerization is preferably carried out in suspension or solution of aliphatic hydrocarbon solvents.

Preparation of component (A)

A further aspect of the invention relates to a process for the preparation of the complex having the general formula Ti($\eta^6$-arene) (AlR$_x$X$_{4-x}$) (wherein "arene", R, X and "x" have the meaning previously defined), which can be used as component (A) of the catalyst of the present invention, comprising contact, under reaction conditions, of the following compounds:

(i) metallic aluminium (ii) an aluminium alkyl halide having the formula AlR$_t$X$_{3-t}$ wherein R and X have the meaning previously defined for the general formula of component (A), and "t" is a number varying from 1 to 2;

(iii) a titanium tetrahalide having the formula TiX$_4$ wherein X represents chlorine, bromine or fluorine preferably chlorine or bromine; and (iv) the arene preselected for the formation of the complex.

Aluminium alkyl halides (ii) which are particularly suitable for the purpose are aluminium diethyl chloride, aluminium ethyl dichloride, aluminium diisobutyl chloride, aluminium isobutyl dichloride and aluminium dioctyl chloride, and the corresponding brominated compounds. Arenes (iv) suitable for the purpose are benzene or benzenes substituted with from 1 to 6 $C_1C_6$ alkyl groups and, preferably, benzene or benzene substituted with from 1 to 6 methyl groups, such as for example toluene, ortho- metaand para-xylene, 1,2,3-trimethylbenzene, 1,2,4-trimethylbenzene, 1,3,5-trimethylbenzene (mesitylene) and hexamethylbenzene.

The reaction is generally carried out with a molar ratio between the aluminium alkyl halide (ii) and titanium tetrahalide (iii) ranging from about 2:1 to about 3:1 and with a quantity of aluminium in excess with respect to the stoichiometric quantity required for the reaction, preferably so that the molar ratio between aluminium (i) and titanium tetrahalide is between about 4:1 and about 6:1, operating in a liquid environment preferably consisting of the same arene (iv) used in excess. In addition, the operating temperature is between 20° C. and 160° C. for a time of 2 to 12 hours. The temperature is typically room temperature (20°–25° C.) for a time of about 12 hours.

From a practical point of view, the aluminium in powder form, the selected arene and the aluminium alkyl halide dissolved in the same arene are charged into a stirred reactor. A suspension is thus obtained to which the titanium tetrahalide (preferably tetrachloride) is added to obtain a mixture which is maintained under the reaction conditions at the temperatures and for the times specified above. At the end of the reaction the excess unaltered metallic aluminium is filtered, and a solution is obtained from which the excess arene is separated, for example by distillation at reduced pressure. The distillation residue is put in an hydrocarbon solvent, preferably aliphatic, to obtain component (A) in the form of a solution.

Operating under the above conditions, the complex is obtained which consists of component (A) with a yield which is at least higher than 80% and normally higher than 90% and up to about 100%, when evaluated on the titanium tetrahalide fed.

Depending on the type of aluminium alkyl halide (ii), titanium tetrahalide (iii) and arene (iv) selected, as well as on the basis of the stoichiometric ratios between the different reagents, complexes (A) can be obtained according to the present invention having different formulae and structures, still remaining however within the general formula previously specified $Ti(\eta^6\text{-arene})(AlR_xX_{4-x})_2$. Considering that the metallic aluminium and arene are generally used in excess with respect to the stoichiometric quantity, it is possible, for example, to use a molar ratio between aluminium alkyl halide (ii) and titanium tetrahalide (iii) if about 2:1 according to the equation:

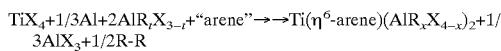

wherein "t" is between 1 and 2 and "x"="t−0.5".

When on the other hand a molar ratio (ii)/(iii)=3/1 is used, the reaction presumably follows the equation:

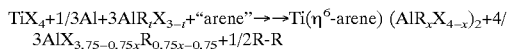

wherein "t" is between 1 and 2 and "x"="t".

The following experimental examples provide a better illustration of the present invention. In particular examples 1 to 10 illustrate the preparation of components (A), examples 11 to 18 describe the preparation of catalysts according to the present invention, and examples 19 to 26 describe polymerization tests which use these catalysts. In some of the formulae of the compounds mentioned in the examples, the following abbreviations have been used: TOL=toluene, TMB=trimethylbenzene, Et=ethyl, $Bu^i$=isobutyl, Oct=n-octyl, Vers.=versatate.

EXAMPLE 1

The following products are introduced in order into a 100 ml flask: 55.55 mmoles (1.5 g) of metallic aluminium, 18.2 mmoles of di-n-octylaluminium chloride in the form of a 1M solution in 1,2,3-trimethylbenzene (1,2,3-TMB) (18.2 ml), and 74 mmoles (10 ml) of 1,2,3-trimethylbenzene (1,2,3-TMB). A suspension is obtained to which, after about 15 minutes of magnetic stirring at 25° C., 9.1 mmoles (1.730 g) of titanium tetrachloride are added.

The molar ratio $TiCl_4:Al:AlOct_2Cl$ is therefore equal to 1:6.1:2.

The mixture is maintained under stirring at 25° C. for 12 hours and at the end of this period a dark purple suspension is obtained. The solid is filtered and the solution is evaporated under vacuum (0.1 torr., 40° C.) until an oily residue is obtained, which is added to anhydrous heptane up to a volume of 30 ml.

A limpid purple solution is obtained, containing 8.72 mmoles of $Ti(\eta^6\text{-}1,2,3\text{-TMB})(AlOct_xCl_{4-x})$, with x equal to about 1.5, with a yield of 95.8% with respect to the starting titanium tetrachloride.

EXAMPLE 2

The following products are introduced in order into a 100 ml flask: 55.55 mmoles (1.5 g) of metallic aluminium, 18.2 mmoles of aluminium diethylchloride in the form of a 1M solution in toluene (18.2 ml), and 94 mmoles (10 ml) of toluene. A suspension is obtained to which, after about 15 minutes of magnetic stirring at 25° C., 9.1 mmoles (1.730 g) of titanium tetrachloride are added.

The molar ratio $TiCl_4:Al:AlEt_2Cl$ is therefore equal to 1:6.1:2.

Operating as described in example 1, a limpid purple solution is obtained, containing 7.77 mmoles of $Ti(\eta^6\text{-TOL})(AlEt_xCl_{4-x})_2$, with x equal to about 1.5, with a yield of 85.44% with respect to the starting titanium tetrachloride.

EXAMPLE 3

The following products are introduced in order into a 100 ml flask: 55.55 mmoles (1.5 g) of metallic aluminium, 18.2 mmoles of aluminium diethylchloride in the form of a 1M solution in 1,3,5-TMB (18.2 ml), and 72 mmoles (10 ml) of 1,3,5-TMB. A suspension is obtained to which, after about 15 minutes of magnetic stirring at 25° C., 9.1 mmoles (1.730 g) of titanium tetrachloride are added.

The molar ratio $TiCl_4:Al:AlEt_2Cl$ is therefore equal to 1:6.1:2.

Operating as described in example 1, a limpid purple solution is obtained, containing 7.48 mmoles of $Ti(\eta^6\text{-}1,3,5\text{-TMB})(AlEt_xCl_{4-x})_2$, with x equal to about 1.5, with a yield of 82.2% with respect to the starting titanium tetrachloride.

EXAMPLE 4

The following products are introduced in order into a 100 ml flask: 55.55 mmoles (1.5 g) of metallic aluminium, 18.2 mmoles of aluminium diisobutylchloride in the form of a 1M solution in toluene (18.2 ml), and 94 mmoles (10 ml) of toluene. A suspension is obtained to which, after about 15 minutes of magnetic stirring at 25° C., 9.1 mmoles (1.730 g) of titanium tetrachloride are added.

The molar ratio $TiCl_4:Al:AlBu^i_2Cl$ is therefore equal to 1:6.1:2.

Operating as described in example 1, a limpid purple solution is obtained, containing 8.54 mmoles of $Ti(\eta^6\text{-TOL})(AlBu^i_xCl_{4-x})_2$, with x equal to about 1.5, with a yield of 93.9% with respect to the starting titanium tetrachloride.

EXAMPLE 5

The following products are introduced in order into a 100 ml flask: 55.55 mmoles (1.5 g) of metallic aluminium, 18.2 mmoles of aluminium ethyldichloride in the form of a 1M solution in toluene (18.2 ml), and 94 mmoles (10 ml) of toluene. A suspension is obtained to which, after about 15 minutes of magnetic stirring at 25° C., 9.1 mmoles (1.730 g) of titanium tetrachloride are added.

The molar ratio $TiCl_4:Al:AlEt_2Cl$ is therefore equal to 1:6.1:2.

Operating as described in example 1, a limpid purple solution is obtained, containing 9.0 mmoles of $Ti(\eta^6\text{-TOL})$ $(AlEt_xCl_{4-x})_2$, with x equal to about 0.5, with a yield of 99.0% with respect to the starting titanium tetrachloride.

EXAMPLE 6

The following products are introduced in order into a 100 ml flask: 55.55 mmoles (1.5 g) of metallic aluminium, 18.2 mmoles of aluminium ethyldichloride in the form of a 1M solution in toluene (18.2 ml), and 94 mmoles (10 ml) of toluene. A suspension is obtained to which, after about 15 minutes of magnetic stirring at 25° C., 9.1 mmoles (1.730 g) of titanium tetrachloride are added.

The molar ratio $TiCl_4:Al:AlEtCl_2$ is therefore equal to 1:6.1:2.

The mixture is maintained under stirring at 110° C. for 12 hours, and at the end of this period a dark violet-coloured suspension is obtained. The solid is filtered and the solution is evaporated under vacuum (0.1 torr., 40° C.) until an oily residue is obtained, which is added to anhydrous heptane up to a volume of 30 ml.

A limpid purple solution is obtained, containing 8.05 mmoles of $Ti(\eta^6\text{-TOL})$ $(AlEt_xCl_{4-x})_2$, with x equal to about 0.5, with a yield of 88.5% with respect to the starting titanium tetrachloride.

EXAMPLE 7

The following products are introduced in order into a 100 ml flask: 55.55 mmoles (1.5 g) of metallic aluminium, 27.3 mmoles of aluminium ethyldichloride in the form of a 1M solution in toluene (27.3 ml), and 94 mmoles (10 ml) of toluene. A suspension is obtained to which, after about 15 minutes of magnetic stirring at 25° C., 9.1 mmoles (1.730 g) of titanium tetrachloride are added.

The molar ratio $TiCl_4:Al:AlEtCl_2$ is therefore equal to 1:6.1:3.

Operating as described in example 1, a limpid purple solution is obtained, containing 9.1 mmoles of $Ti(\eta^6\text{-TOL})$ $(AlEt_xCl_{4-x})_2$, with x equal to about 1, with a practically total yield with respect to the starting titanium tetrachloride.

EXAMPLE 8

The following products are introduced in order into a 100 ml flask: 55.55 mmoles (1.5 g) of metallic aluminium, 18.1 mmoles of aluminium isobutyldichloride in the form of a 1M solution in toluene (18.1 ml), and 94 mmoles (10 ml) of toluene. A suspension is obtained to which, after about 15 minutes of magnetic stirring at 25° C., 9.1 mmoles (1.730 g) of titanium tetrachloride are added.

The molar ratio $TiCl_4:Al:AlBu^iCl_2$ is therefore equal to 1:6.1:2.

Operating as described in example 1, a limpid purple solution is obtained, containing 8.94 mmoles of $Ti(\eta^6\text{-TOL})$ $(AlBu^i_xCl_{4-x})_2$, with x equal to about 0.5, with a yield of 93.9% with respect to the starting titanium tetrachloride.

EXAMPLE 9

The following products are introduced in order into a 100 ml flask: 55.55 mmoles (1.5 g) of metallic aluminium, 27.3 mmoles of aluminium isobutyldichloride in the form of a 1M solution in toluene (27.3 ml), and 94 mmoles (10 ml) of toluene. A suspension is obtained to which, after about 15 minutes of magnetic stirring at 25° C., 9.1 mmoles (1.730 g) of titanium tetrachloride are added.

The molar ratio $TiCl_4:Al:AlBu^iCl_2$ is therefore equal to 1:6.1:3.

Operating as described in example 1, a limpid purple solution is obtained, containing 8.91 mmoles of $Ti(\eta^6\text{-TOL})$ $(AlBu^i_xCl_{4-x})_2$, with x equal to about 1, with a yield of 98.0% with respect to the starting titanium tetrachloride.

EXAMPLE 10

1.38 g (8.54 mmoles) of hexamethylbenzene are added, in an atmosphere of inert gas, to 30 ml of a purple solution containing 8.54 mmoles of $Ti(\eta^6\text{-TOL})$ $(Al-Bu^i_xCl_{4-x})_2$, prepared as described in example 4 and the solution is maintained under stirring for 1 hour at a temperature of 25° C. The reactor is then cooled to −78° C. A purple crystalline solid precipitates which is filtered and dried. 4.72 g of a solid are obtained, which contains Ti:Al:Cl in the following molar proportions: 1:1.99:4.98. Expressing in weight percentage, the solid component contains: Ti 8.01%, Al 8.95%, Cl 29.7% and organic fraction 46.48%.

EXAMPLE 11

In a stirred 100 ml reactor, 5 ml of a solution of $Ti(\eta^6\text{-}1,2,3\text{-TMB})$ $(AlOct_xCl_{4-x})_2$, obtained as in example 1 (concentration of the titanium of 300 mmoles/l; 1.5 mmoles of titanium) are diluted to 40 ml with anhydrous heptane, operating under nitrogen at room temperature. 1.5 ml of a 1 M solution of vanadium tetrachloride in anhydrous heptane (1.5 mmoles of $VCl_4$; molar ratio Ti:V=1:1) are then added to the reactor, at a temperature of 25° C. A brown-coloured solid is immediately formed. The volume of the mixture is brought to about 50 ml by adding anhydrous heptane, the stirred suspension is heated to 80° C. for 30 minutes and is then cooled to room temperature.

For analytical purposes, half of the suspension is filtered and the separated solid is washed with three 50 ml portions of anhydrous n-hexane. 0.35 g of a solid component are obtained, which contain Ti:V:Al:Cl in the following molar proportions: 1:1.1:1:8.0. Expressing in weight percentage, the solid component contains: Ti 8.5%, V 10.0%, Al 4.8%, Cl 50.5% and organic fraction 26.2%.

Analysis of the filtrate gives the following results: Al:Cl= 1:2.2 in moles, with a ratio between the quantity of aluminium in the filtrate and the total aluminium charged of 59.1%.

EXAMPLE 12

The same procedure is used as in example 11 with the difference that 1.5 ml of a 1M solution in heptane of titanium tetrachloride (1.5 mmoles), are used instead of the solution of vanadium tetrachloride.

0.36 g of a solid component are obtained, which contains Ti:Al:Cl in the following molar proportions 1:0.34:3.3. Expressing in weight percentage, the solid component contains: Ti 19.9%, Al 3.4%, Cl 48.6% and organic fraction 28.1%.

Analysis of the filtrate gives the following results: Al:Cl= 1:2.2 in moles, with a ratio between the quantity of aluminium in the filtrate and the total aluminium charged of 69.7%.

EXAMPLE 13

The same procedure is used as in example 11 with the difference that 3.0 ml of a 1M solution of vanadium tetrachloride (3.0 mmoles), are used instead of 1.5 ml.

0.61 g of a solid component are obtained, which contains Ti:V:Al:Cl in the following molar proportions 1:2.1:1.8:13.1. Expressing in weight percentage, the solid component contains: Ti 5.4%, V 12.1%, Al 5.5%, Cl 56.5% and organic fraction 28.1%.

Analysis of the filtrate shows the absence of aluminium.

EXAMPLE 14

The same procedure is used as in example 11 with the difference that 0.5 ml of a 1M solution of titanium tetrachloride (0.5 mmoles) and 1.0 ml of a 1M solution of vanadium tetrachloride (1.0 mmoles), are used instead of the solution of vanadium tetrachloride alone.

0.29 g of a solid component are obtained, which contains Ti:V:Al:Cl in the following molar proportions 1:0.50:0.3:5.2. Expressing in weight percentage, the solid component contains: Ti 16.6%, V 8.8%, Al 2.81%, Cl 63.9% and organic fraction 17.89%.

Analysis of the filtrate gives the following results: Al:Cl= 2.1:1 in moles, with a ratio between the quantity of aluminium in the filtrate and the total aluminium charged of 83%.

EXAMPLE 15

The same procedure is used as in example 11 with the difference that 0.3 ml of a 1M solution of titanium tetrachloride (0.3 mmoles) and 1.2 ml of a 1M solution of vanadium tetrachloride (1.2 mmoles), are used instead of the solution of vanadium tetrachloride alone.

0.28 g of a solid component are obtained, which contains Ti:V:Al:Cl in the following molar proportions 1:0.77:0.5:5.9. Expressing in weight percentage, the solid component contains: Ti 11.6%, V 9.5%, Al 3.3%, Cl 50.7% and organic fraction 25%.

Analysis of the filtrate gives the following results: Al:Cl= 1:2.1 in moles, with a ratio between the quantity of aluminium in the filtrate and the total aluminium charged of 71.0%.

EXAMPLE 16

The same procedure is carried out as in example 11 with the difference that 2.25 ml of a 1M solution of vanadium tetrachloride (2.25 mmoles), is used instead of 1.5 ml.

0.37 g of a solid component are obtained, which contains Ti:V:Al:Cl in the following molar proportions 1:1.6:1.6:11.9. Expressing in weight percentage, the solid component contains: Ti 7.1%, V 12.1%, Al 6.4%, Cl 62.6% and organic fraction 11.8%.

Analysis of the filtrate gives the following results: Al:Cl in moles, with a ratio between the quantity of aluminium in the filtrate and total aluminium charged of 12.4%.

EXAMPLE 17

5 ml of a solution of $Ti(\eta^6\text{-TOL})(AlEt_xCl_{4-x})_2$ obtained as in example 2 ((Ti)=260 mmoles/l; 1.30 mmoles of titanium) are diluted to 40 ml with anhydrous heptane, operating in a stirred 100 ml reactor, in a nitrogen atmosphere. 1.3 ml of a 1M solution of vanadium tetrachloride (1.3 mmoles) in anhydrous heptane (molar ratio Ti:V=1:1) are then added, at a temperature of 25° C., and the volume is brought to a total of 50 ml. A brown-coloured solid is immediately formed. The mixture is brought to a volume of a total of 50 ml by adding anhydrous heptane, forming a suspension which is then heated to 80° C. and maintained at this temperature for 30 minutes, under vigorous stirring.

For analytical purposes, half of the suspension is filtered and the separated solid is washed with three 50 ml portions of anhydrous n-hexane and dried. 0.21 g of a solid component are obtained, which contains Ti:V:Al:Cl in the following molar proportions: 1:1:0.8:7.8. Expressing in weight percentage, the solid component contains: Ti 11.6%, V 12.3%, Al 5.2%, Cl 66.7% and organic fraction 4.2%.

Analysis of the filtrate gives the following results: Al:Cl= 2.1:1 in moles, with a ratio between the quantity of aluminium in the filtrate and the total aluminium charged of 58.6%.

EXAMPLE 18

5 ml of a solution of $Ti(\eta^6\text{-TOL})(AlBu^i_xCl_{4-x})_2$ obtained as in example 4 ([Ti]=285 mmoles/l; 1.42 mmoles of titanium) are diluted to 40 ml with anhydrous heptane, operating in a stirred 100 ml reactor, in a nitrogen atmosphere. 1.42 ml of a 1M solution of vanadium tetrachloride (1.42 mmoles) in anhydrous heptane (molar ratio Ti:V=1:1) are then added, at a temperature of 25° C., and the volume is brought to a total of 50 ml. A brown-coloured solid is immediately formed. The mixture is brought to a volume of a total of 50 ml by adding anhydrous heptane, forming a suspension which is then heated to 80° C. and maintained at this temperature for 30 minutes, under vigorous stirring.

For analytical purposes, half of the suspension is filtered and the separated solid is washed with three 50 ml portions of anhydrous n-hexane and dried. 0.24 g of a solid component are obtained, which contains Ti:V:Al:Cl in the following molar proportions: 1:1.1:0.7:8.0. Expressing in weight percentage, the solid component contains: Ti 11.2%, V 13.1%, Al 4.4%, Cl 66.0% and organic fraction 5.6%.

Analysis of the filtrate gives the following results: Al:Cl= 1.9:1 in moles, with a ratio between the quantity of aluminium in the filtrate and the total aluminium charged of 57.6%.

EXAMPLE 19

5.16 ml of a solution of $Ti(\eta^6\text{-1,2,3-TMB})(AlOct_xCl_{4-x})_2$ obtained as in example 1 ([Ti]=290 mmoles/l; 1.50 mmoles of titanium) are diluted to 40 ml with anhydrous heptane, operating at room temperature, in a stirred 100 ml reactor, in a nitrogen atmosphere. 3 ml of a 0.5M solution of $TiCl_{1.65}Vers_{2.35}$ (1.5 mmoles) in anhydrous heptane (molar ratio Ti(II):Ti(IV)=1:1) are then added, at a temperature of 25° C. A brown-coloured solid is immediately formed. The mixture is brought to a volume of a total of 50 ml by adding anhydrous heptane, forming a suspension which is then heated to 80° C. and maintained at this temperature under vigorous stirring for 30 minutes, and finally cooled to room temperature.

For analytical purposes, half of the suspension is filtered and the separated solid is washed with three 50 ml portions of anhydrous n-hexane and dried. 0.22 g of a solid component are obtained, which contains Ti and Cl in the molar proportion: 1:2.4. Expressing in weight percentage, the solid component contains: Ti 21.8%, Cl 38.7% and organic fraction 39.5%.

Analysis of the filtrate gives the following results: Al:Cl= 1:0.9 in moles, with a ratio between the quantity of aluminium in the filtrate and the total aluminium charged of 100%.

EXAMPLE 20

3.55ml of a solution of Ti($\eta^6$-1,2,3-TMB) (AlOct$_x$Cl$_{4-x}$)$_2$ obtained as in example 1 ([Ti]=290 mmoles/l; 1.03 mmoles of titanium) are reacted with 30 ml of a 0.034M solution of VClVers$_3$, operating exactly as described in example 19 (molar ratio Ti:V=1:1). At the end a suspension in heptane is obtained, half of which, for analytical purposes, is filtered and the separated solid is washed with three 50 ml portions of anhydrous n-hexane and dried. 0.20 g of a solid are obtained, which contains Ti V, Al and Cl in the respective molar proportions: 1:1.4:0.66:6.1. Expressing in weight percentage, the solid component contains: Ti 8.1%, V 12.1%, Al 3.0%, Cl 36.5% and organic fraction 40.3%.

Analysis of the filtrate gives the following results: Al:Cl= 1:0.7 in moles, with a ratio between the quantity of aluminium in the filtrate and the total aluminium charged of 68%.

EXAMPLE 21

2.62 ml of a solution of Ti($\eta^6$-1,2,3-TMB) (AlOct$_x$Cl$_{4-x}$)$_2$ obtained as in example 1 ([Ti]=290 mmoles/l; 0.76 mmoles of titanium) are diluted to 40 ml with anhydrous heptane, operating exactly as described in example 19. 0.243 g of HfCl$_4$ (0.76 mmoles) and 0.76 ml of a 1.0M solution of TiCl$_4$ (0.76 mmoles) in anhydrous heptane (molar ratio Ti(tot):Hf=2:1) are then added, at a temperature of 25° C. A brown-coloured solid is immediately formed. The mixture is brought to a volume of a total of 50 ml by adding anhydrous heptane, forming a suspension which is then heated to 80° C. and maintained at this temperature under vigorous stirring for 30 minutes, and finally cooled to room temperature.

At the end a suspension in heptane is obtained, half of which, for analytical purposes, is filtered and the separated solid is washed with three 50 ml portions of anhydrous n-hexane and dried. 0.42 g of a solid component are obtained, which contains Ti, Hf, Al and Cl in the respective molar proportions: 1:0.6:0.3:5.7. Expressing in weight percentage, the solid component contains: Ti 11.5%, Hf 25.7%, Al 1.9, Cl 48.4% and organic fraction 12.5%.

Analysis of the filtrate gives the following results: Al:Cl= 1:2.1 in moles, with a ratio between the quantity of aluminium in the filtrate and the total aluminium charged of 70.2%.

EXAMPLE 22

3.55 ml of a solution of Ti($\eta^6$-1,2,3-TMB) (AlOct$_x$Cl$_{4-x}$)$_2$ obtained as in example 1 ([Ti]=290 mmoles/l; 1.03 mmoles of titanium) are reacted with 0.5 ml of a 1M solution of SnCl$_4$, operating exactly as described in example 19 (0.5 mmoles of Sn; molar ratio Ti:Sn=2:1). At the end a suspension in heptane is obtained, half of which, for analytical purposes, is filtered and the separated solid is washed with three 50 ml portions of anhydrous n-hexane and dried. 0.31 g of a solid are obtained, which contains Ti, Sn, Al and Cl in the respective molar proportions: 1:0.5:0.07:3.6. Expressing in weight percentage, the solid component contains: Ti 15.75%, Sn 19.48%, Al 0.62, Cl 41.89% and organic fraction 22.26%.

Analysis of the filtrate gives the following results: Al:Cl= 1:2.3 in moles, with a ratio between the quantity of aluminium in the filtrate and the total aluminium charged of 89.7%.

EXAMPLE 23

A solid component is prepared with the same reagents and following the same procedure as example 21, but using 0.76 mmoles of VCl$_4$ instead of 0.76 mmoles of TiCl$_4$ (molar ratio Ti:V=1:1). At the end a suspension in heptane is obtained, half of which, for analytical purposes, is filtered and the separated solid is washed with three 50 ml portions of anhydrous n-hexane and dried. 0.380 g of a solid component are obtained, which contains Ti, V, Hf, Al and Cl in the respective molar proportions: 1:0.9:1:0.7:10.8. Expressing in weight percentage, the solid component contains: Ti 6.10%, V 5.83%, Hf 22.67%, Al 2.40%, Cl 48.64% and organic fraction 14.36%.

Analysis of the filtrate gives the following results: Al:Cl= 1:2.1 in moles, with a ratio between the quantity of aluminium in the filtrate and the total aluminium charged of 74.1%.

EXAMPLE 24

The following products are charged in order into a stirred 5 liter reactor (autoclave), under a ethylene atmosphere: 1.900 ml of anhydrous heptane, 0.120 g of aluminium triethyl and 50 g of anhydrous hexene-1. The reactor is brought to a temperature of 155° C., is pressurized with ethylene to 5 kg/cm$^2$ and 33.7 mg of the solid component obtained in example 11 are charged. The molar ratio AlEt$_3$/(Ti+V) is therefore equal to 8.3/1.

The mixture is polymerized at 155° C., for 20 minutes, maintaining the pressure at 5 kg/cm$^2$ by continuous feeding with ethylene. At the end of this period of time, the polymerization is interrupted and 2 ml of ethanol and 12 g of CO$_2$ are introduced. The mixture is cooled to room temperature and the suspension is coagulated with methanol. After filtration and drying of the solid panel, 52.4 g of ethylene/hexene copolymer are recovered, with a productivity of 1.55 (kg of copolymer per gram of catalytic solid), yield of titanium 18.2 (kg of copolymer per gram of titanium in the catalytic solid) and yield of vanadium 15.6 (kg of copolymer per gram of vanadium in the catalytic solid).

The characteristics of the copolymer are: melt-index=0.35 g/10 min. (ASTM D1238), shear sensitivity=12.10 (ASTM D1238F) and density=0.9070 g/ml (ASTM 1280).

EXAMPLE 25

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 29.64 mg of the catalytic solid obtained in example 12 (molar ratio AlEt$_3$/(Ti+V)=8.5/1), are charged.

Proceeding as in example 24, 6.0 g of ethylene/hexene copolymer are obtained, with a productivity of 0.20 and a yield of titanium of 1.1.

The characteristics of the copolymer are: melt-index=0.38 g/10 min.; shear sensitivity=25.0 and density=0.9170 g/ml.

EXAMPLE 26

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 25.47 mg of the catalytic solid obtained in example 13 (molar ratio AlEt$_3$/(Ti+V)=11.2/1), are charged.

Proceeding as in example 24, 32.0 g of ethylene/hexene copolymer are obtained, with a productivity of 1.26 and a yield of titanium of 22.2 and a yield of vanadium of 9.96.

The characteristics of the copolymer are: melt-index=0.30 g/10 min.; shear sensitivity=13.80 and density=0.9120 g/ml.

EXAMPLE 27

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 17.31 mg of the catalytic solid obtained in example 14 (molar ratio AlEt$_3$/(Ti+V)=11.7/1), are charged.

Proceeding as in example 24, 23.1 g of ethylene/hexene copolymer are obtained, with a productivity of 1.33 and a yield of titanium of 8.0 and a yield of vanadium of 15.10.

The characteristics of the copolymer are: melt-index= 0.278 g/10 min.; shear sensitivity=15.64 and density=0.907 g/ml.

EXAMPLE 28

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 24.9 mg of the catalytic solid obtained in example 17 (molar ratio AlEt$_3$/(Ti+V)=9.8/1), are charged.

Proceeding as in example 24, 55.3 g of ethylene/hexene copolymer are obtained, with a productivity of 2.22 and a yield of titanium of 19.2 and a yield of vanadium of 18.07.

The characteristics of the copolymer are: melt-index=0.32 g/10 min.; shear sensitivity=13.20 and density=0.9050 g/ml.

EXAMPLE 29

The same procedure is carried out as in example 24, charging into the reactor 1.900 ml of anhydrous n-heptane and 50 g of anhydrous hexene-1, but without adding aluminium triethyl. The reactor is brought to a temperature of 155° C., is pressurized with ethylene up to 5 kg/cm$^2$ and 30 ml of the suspension obtained in example 14, which contains 0.2853 g of catalytic solid (molar ratio AlEt$_3$/(Ti+V)=0), are charged.

Proceeding as in example 24, 25.1 g of ethylene/hexene copolymer are obtained, with a productivity of 0.09 and a yield of titanium of 0.53 and a yield of vanadium of 1.06.

The characteristics of the copolymer are: melt-index= 0.269 g/10 min.; shear sensitivity=14.93 and density=0.9068 g/ml.

EXAMPLE 30

The test of example 29 is repeated, but adding to the reactor aluminium triethyl in a quantity of only 0.060 g with the function of impurity scavenger.

In this test 80.3 g of ethylene/hexene copolymer are obtained, with a productivity of 0.844 and a yield of titanium of 5.08 and a yield of vanadium of 9.59.

The characteristics of the copolymer are: melt-index= 0.266 g/10 min.; shear sensitivity=15.33 and density=0.9082 g/ml.

EXAMPLE 31

The same procedure is carried out as in example 24, charging into the reactor 1.900 ml of anhydrous n-heptane, 0.120 g of aluminium triethyl and 50 g of anhydrous hexene-1; The reactor is brought to a temperature of 155° C., is pressurized with ethylene up to 5 kg/cm$^2$ and 52.8 mg of the solid catalyst component obtained in example 19 (molar ratio AlEt$_3$/Ti=4.2/1), are charged.

Proceeding as in example 24, 8.10 g of ethylene/hexene copolymer are obtained, with a productivity of 0.15 and a yield of titanium of 0.70.

The characteristics of the copolymer are: melt-index=0.60 g/10 min.; shear sensitivity=24.0 and density=0.910 g/ml.

EXAMPLE 32

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 56.3 mg of the solid catalyst component obtained in example 20 (molar ratio AlEt$_3$/(Ti+V)=4.38/1), are charged.

Proceeding as in example 24, 30.5 g of ethylene/hexene copolymer are obtained, with a productivity of 0.54 and a yield of titanium of 6.70 and a yield of vanadium of 4.48.

The characteristics of the copolymer are: melt-index=0.78 g/10 min.; shear sensitivity=19.40 and density=0.916 g/ml.

EXAMPLE 33

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 36.23 mg of the solid catalyst component obtained in example 21 (molar ratio AlEt$_3$/(Ti+Hf)=7.19/1), are charged.

Proceeding as in example 24, 4.1 g of ethylene/hexene copolymer are obtained, with a productivity of 0.11 and a yield of titanium of 0.98.

The characteristics of the copolymer are: melt-index=0.19 g/10 min.; shear sensitivity=18.9 and density=0.918 g/ml.

EXAMPLE 34

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 30.5 mg of the solid catalyst component obtained in example 22 (molar ratio AlEt$_3$/(Ti+Sn)=6.67/1), are charged.

Proceeding as in example 24, 28.8 g of ethylene/hexene copolymer are obtained, with a productivity of 0.94 and a yield of titanium of 6.0 and a yield of tin of 4.85.

The characteristics of the copolymer are: melt-index=0.12 g/10 min.; shear sensitivity=20.50 and density=0.920 g/ml.

EXAMPLE 35

The same procedure is carried out as in example 24, charging into the reactor 1.900 ml of anhydrous n-heptane, 0.120 g of aluminium triethyl and 50 g of anhydrous hexene-1. The reactor is brought to a temperature of 155° C., is pressurized with ethylene up to 5 kg/cm$^2$ and 45.29 mg of the solid catalyst component obtained in example 23 (molar ratio AlEt$_3$/(Ti+V)=9.05/1), are charged.

Proceeding as in example 24, 34.3 g of ethylene/hexene copolymer are obtained, with a productivity of 0.75 and a yield of titanium of 12.3 and a yield of vanadium of 12.9.

The characteristics of the copolymer are: melt-index=0.74 g/10 min.; shear sensitivity=12.41 and density=0.918 g/ml.

EXAMPLE 36

The same procedure is carried out as in example 24, charging into the reactor 1.900 ml of anhydrous n-heptane, 0.120 g of aluminium triethyl, 50 g of anhydrous hexene-1 and, in addition, 39.2 mg of dichloroethane (DCE; 0.4 mmoles; molar ratio DCE/AlEt$_3$=0.4). The reactor is brought to a temperature of 155° C., is pressurized with ethylene up to 5 kg/cm$^2$ and 15.2 mg of the solid catalyst component obtained in example 11 (molar ratio AlEt$_3$/(Ti+V)=18.5/1), are charged.

Proceeding as in example 24, 35.1 g of ethylene/hexene copolymer are obtained, with a productivity of 2.3, a yield of titanium of 27.1 and a yield of vanadium of 23.1.

The characteristics of the copolymer are: melt-index= 0.314 g/10 min.; shear sensitivity=11.76 and density=0.907 g/ml.

EXAMPLE 37

500 ml of n-heptane containing, in solution, 0.5 mmoles of triisobutylaluminium are charged into a stirred 1 liter reactor (autoclave). The reactor is brought to a temperature of 50° C. and propylene is sent, under stirring, until a pressure of 4 kg/cm$^2$ is reached, at equilibrium. 1.41 mg of the solid component of catalyst obtained in example 11 are then charged, maintaining the suspension in heptane and charging them into the reactor by means of a stream of ethylene until a pressure of 5 kg/cm$^2$ is reached. The molar ratio Al/(Ti+V) is therefore equal to 95/1 (in this ratio Al is that introduced as triisobutylaluminium).

Polymerization is carried out at 50° C., for 25 minutes, maintaining the pressure at 5 kg/cm$^2$ by the continuous feeding of ethylene. At the end of this period of time, the polymerization is interrupted and 20 ml of an ethanolic solution of ionol is introduced. The mixture is cooled to room temperature and the suspension is coagulated with methanol. After filtration and drying of the solid panel, 19.9 g of ethylene/propylene copolymer are recovered, having an intrinsic viscosity of 3.1 dl/g (measured in decaline at 135° C.) and a content of units deriving from propylene of 52.3% with respect to the total units (calculated by $^1$HNMR spectroscopy). A productivity of 14.1 is obtained (kg of copolymer per gram of catalytic solid), with a yield of titanium of 167.0 (kg of copolymer per gram of titanium in the catalytic solid) and a yield of vanadium of 141.1 (kg of copolymer per gram of vanadium in the catalytic solid).

EXAMPLE 38

500 ml of n-heptane containing, in solution, 0.5 mmoles of triisobutylaluminium and 20 ml (15.1 g) of 7-methyl-1,6-octadiene are charged into a 1 liter stirred reactor. The same procedure is carried out as in example 37, sending propylene up to a pressure of 4 kg/cm$^2$ at equilibrium at 50° C. and subsequently charging 1.41 mg of the solid catalyst component obtained in example 1 and ethylene up to 5 kg/cm$^2$. The molar ratio AlBu$^i_3$/(Ti+V) is therefore equal to 95/1.

Polymerization is carried out at 50° C., for 25 minutes, maintaining the pressure at 5 kg/cm$^2$ by the continuous feeding of ethylene. At the end of this period of time, the polymerization is interrupted and 20 ml of an ethanolic solution of ionol is introduced. The mixture is cooled to room temperature and the suspension is coagulated with methanol. After filtration and drying of the solid panel, 9.5 g of ethylene/propylene/diene copolymer are recovered, having an intrinsic viscosity of 2.9 dl/g (measured in decaline at 135° C.). The copolymer thus obtained contains 47.9% of units deriving from propylene and 7.6% of unsaturated units deriving from 7-methyl-1,6-octadiene, the rest consisting of units deriving from ethylene (calculated from measurements carried out by $^1$HNMR spectroscopy). A productivity of 6.7 is obtained (kg of copolymer per gram of catalytic solid), with a yield of titanium of 78.8 (kg of copolymer per gram of titanium in the catalytic solid) and a yield of vanadium of 66.9 (kg of copolymer per gram of vanadium in the catalytic solid).

We claim:

1. Catalyst for the homopolymerization or copolymerization of ethylene, comprising titanium, aluminum and halogen, said catalyst obtained by a process comprising the contact of components (A), (B), and optionally, (C) and (D) in the respective molar proportions (1):(0.5–2):(0–25):(0–15), said components consisting of:

(A) an arene of divalent titanium having the formula Ti($\eta^6$-arene)(AlR$_x$X$_{4-x}$)$_2$;
    (B) a compound or mixture of compounds selected from the group consisting of the halides of the metals titanium, zirconium, vanadium, hafnium, tin, germanium, cerium, and osmium, in the oxidation state (+4) and antimony and vanadium in the oxidation state (+5); and derivatives of these metals in said oxidation states with oxygenated binders, wherein at least one oxygen atom of said binders is bound or coordinated to the metal;
    (C): optionally, an organic compound of aluminum having the formula AlR'$_z$Z$_{3-z}$;
    (D): optionally, an organic chloroderivative selected from the group consisting of:
        (a) di- and poly-chloroalkanes;
        (b) alkyl esters of aliphatic carboxylic acids di- and tri-chlorosubstituted on the carbon in the alpha position with respect to the carboxyl, and
        (c) derivatives of chlorotriphenylmethane and dichlorodiphenylmethane having a carboxyalkyl group in the para position of at least one of the phenyl rings;
    wherein in the above formulae:
        "arene" indicates benzene, or a benzene substituted with from 1 to 6 C$_1$–C$_6$ alkyl groups;
        X represents a chlorine, bromine or fluorine atom;
        Z represents a chlorine or bromine atom;
        R is a C$_1$–C$_{10}$ alkyl group, linear or branched;
        R' is a C$_1$–C$_{10}$ alkyl group, linear or branched;
        "x" is a number varying from 0.5 to 2.5;
        "z" is a number varying from 1 to 3.

2. Catalyst according to claim 1, characterized in that X in the formula of component (A) and Z in the formula of component (C) are both Cl, and "x" is between 0.5 and 1.5, including extremes.

3. Catalyst according to claims 1, characterized in that in component (A) the arene is benzene or benzene substituted with 1 to 6 methyl groups.

4. Catalyst according to claim 3, characterized in that said arene is toluene, ortho-, meta- or para-xylene, 1,2,3-trimethylbenzene, 1,2,4-trimethylbenze, 1,3,5-trimethylbenzene (mesitylene) or hexamethylbenzene.

5. Catalyst according to claim 2, characterized in that in the formula of component (A), R represents an ethyl, butyl, isobutyl or n-octyl group.

6. Catalyst according to claim 5, characterized in that said component (A) is selected from:

Ti($\eta^6$-TOL) (AlEt$_x$Cl$_{4-x}$)$_2$,
Ti($\eta^6$-TOL) (AlBu$^i_x$Cl$_{4-x}$)$_2$, Ti($\eta^6$-TOL) (AlOct$_x$Cl$_{4-x}$)$_2$,
Ti($\eta^6$-1,3,5-TMB) (AlEt$_x$Cl$_{4-x}$)$_2$,
Ti($\eta^6$-1,3,5-TMB) (AlBu$^i_x$Cl$_{4-x}$)$_2$,
Ti($\eta^6$-1,3,5-TMB) (AlOct$_x$Cl$_{4-x}$)$_2$,
Ti($\eta^6$-1,2,3-TMB) (AlEt$_x$Cl$_{4-x}$)$_2$,
Ti($\eta^6$-1,2,3-TMB) (AlBu$^i_x$Cl$_{4-x}$)$_2$ and
Ti($\eta^6$-1,2,3-TMB) (AlOct$_x$Cl$_{4-x}$)$_2$, wherein: TOL=toluene, TMB=trimethylbenzene, Et=ethyl, Bu$^i$=isobutyl and Oct=n-octyl.

7. Catalyst according to claim 1, characterized in that said component (B) is a compound having the general formula MX'$_4$ or SbX'$_5$ or VOX'$_3$ wherein M represents a metal in the tetravalent oxidation state (+4) selected from titanium, vanadium, zirconium, hafnium, tin, germanium, cerium and osmium, Sb is antimony and VO is the vanadyl group, and each X' independently represents a fluorine, chlorine, or bromine atom.

8. Catalyst according to claim 7, wherein said component (B) is selected from the tetrachlorides of titanium, vanadium, zirconium, hafnium and tin, and vanadyl trichloride.

9. Catalyst according to claim 1, characterized in that said component (B) is selected from compounds represented by one of the following formulae:

  (I)

  (II)

wherein:
M" and M'" independently represent titanium (Ti), vanadium (V), zirconium (Zr), hafnium (Hf), tin (Sn), germanium (Ge), cerium (Ce), osmium (Os), antimony (Sb) and vanadyl (VO)

X" and X'" independently represent a fluorine, chlorine or bromine atom;

R" is an aliphatic hydrocarbon group, containing from 1 to about 25 carbon atoms, or a cycloaliphatic or aromatic group containing from 6 to about 25 carbon atoms;

R'" is a linear or branched alkyl group having from 1 to 10 carbon atoms, or a cycloalkyl, aryl group, or C$_6$–C$_{12}$ alkyl-substituted aryl group;

"m" and "n" represent respectively the valence of M" and M'" and have the value of "4" when M" or M'" are Ti, V, Zr, Hf, Sn, Ge, Ce and Os; the value of "5" when M" or M'" are Sb and the value of "3" when M" or M'" are VO (vanadyl);

"y" is a number varying from 1 to "n";

"w" is a number varying from 1 to "m".

10. Catalyst according to claim 9, wherein said component (B) is a compound included in formula (I) selected from the group consisting of tetra-ethoxide, tetra-propoxide, tetra-n-butoxide, tetra-iso-butoxide and an alkoxychloride of titanium, vanadium, zirconium, hafnium and tin and mixtures of said alkoxychlorides thereof; and the corresponding triderivatives of vanadyl alkoxides and vanadyl alkoxychlorides with said oxygenated binders.

11. Catalyst according to claim 9, wherein said component (B) is a compound included in formula (I) selected from the group carboxylates consisting of tetra-n-decanoate, tetra-n-undecanoate, tetra-iso-butyrate, tetra-2-ethylhexanoate, tetra-2-dimethylpropanoate, tetra-versatate, tetra-3-ethylpentanoate, tetra-citronellate, tetra-naphthenate, tetra-2-phenyl-butyrate and a chloride-carboxylate of titanium, vanadium, zirconium, hafnium and tin and mixtures of said chloride-carboxylates thereof; and triderivatives of vanadyl carboxylates and chloro-carboxylates with said oxygenated binders.

12. Catalyst according to claim 9, characterized in that said component (B) is selected from compounds having the following formulae: TiCl$_4$, VCl$_4$, VOCl$_3$, HfCl$_4$, ZrCl$_4$, SnCl$_4$, Ti(O-n-Bu)$_4$, Ti(Versatate)$_2$Cl$_2$, V(Versatate)$_2$Cl$_2$ and VO(O—Pr$_i$)$_3$.

13. Catalyst according to claim 1 wherein said component (C) is selected from the group consisting of aluminum triethyl, aluminum tri-isobutyl, aluminum tri-n-octyl, aluminum diethyl chloride, aluminum ethyl dichloride, aluminum ethyl sesquichloride, aluminum di-isobutyl chloride, aluminum iso-butyl dichloride, aluminium di-n-octyl chloride, and aluminum octyl dichloride.

14. Catalyst according to claim 1, wherein said component (D) is selected from:

dichloromethane;

α,β-dichloroalkanes, as represented by the following formula:

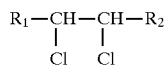

wherein R$_1$ and R$_2$ each independently represent a hydrogen atom or a C$_1$–C$_{10}$ alkyl group;

α,ω-dichloroalkanes, as represented by the following formula:

wherein r is an integer from 1 to 10;

a trichloro having a chlorine atom on the two chain-end carbon atoms, as represented by the formula:

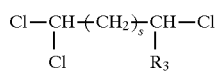

wherein R$_3$ represents a halogen atom, and "s" is an integer from 1 to 10;

trichloroalkanes having the chlorine atoms on a chain-end carbon atom, represented by the following formula:

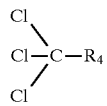

wherein R$_4$ represents a C$_1$–C$_{10}$ alkyl group;

aromatic organic chloroderivatives which can be defined with one of the following formulae:

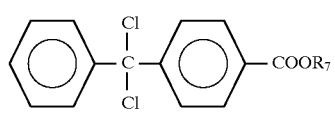

-continued

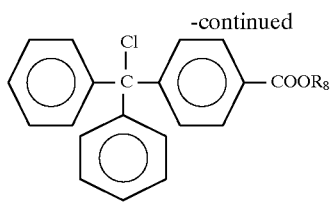

wherein $R_7$ and $R_8$ independently represent a $C_1$–$C_{10}$, alkyl group;

chlorocarboxylates having the formula:

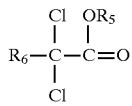

wherein $R_6$ represents a hydrogen atom, a chlorine atom or a $C_1$–$C_{10}$ alkyl group and $R_5$ represents a $C_1$–$C_{10}$ alkyl group.

15. Catalyst according to claim 14, characterized in that said component (D) is selected from the group consisting of: dichloromethane; the methyl and ethyl esters of 1,1-dichloroacetic or 1,1,1-trichloroacetic acids; 1,2-dichloroethane, 1,3-trichloropropane, 1,4-dichlorobutane, 2,3-dichlorobutane, 1,4-dichloropentane, 1,6-dichlorohexane, 1,1,1-trichloroethane and 1,1,2-trichloroethane.

16. Catalyst according to claim 14, characterized in that said component (D) is selected from 1,2-dichloroethane and 2,3-dichlorobutane.

17. Catalyst according to claim 1, characterized in that the molar ratios between components (A), (B), (C) and (D) are in the respective order within the ranges (1.0):(0.5–2.0):(0.0–16):(3.0–10).

18. Catalyst according to claim 1, wherein the contact between components (A) and (B), (C) or (D), is carried out in an aliphatic or aromatic hydrocarbon, outside the polymerization reactor or inside the reactor itself, operating at a temperature in the range 20°–25° C. or at higher temperatures, up to the polymerization temperature wherein said aliphatic or aromatic hydrocarbon is inert towards said catalyst.

19. The catalyst according to claim 14, wherein each said $R_1$ and $R_2$ each independently is a $C_1$–$C_5$ alkyl group;

wherein "r" is an integer from 1 to 5;

wherein $R_3$ is chlorine;

wherein "s" is an integer from 1 to 5;

wherein $R_4$ represents a $C_1$–$C_5$ alkyl group;

wherein $R_7$ and $R_8$ independently represent a $C_1$–$C_5$ alkyl group;

wherein $R_5$ represents a $C_1$–$C_5$ alkyl group; and wherein $R_6$ represents a $C_1$–$C_5$ alkyl group.

* * * * *